United States Patent [19]
Narayanan

[11] Patent Number: 5,598,519
[45] Date of Patent: Jan. 28, 1997

[54] METHOD AND SYSTEM FOR DIRECT CELL FORMATTING IN A SPREADSHEET

[75] Inventor: Raman Narayanan, Bellevue, Wash.

[73] Assignee: Microsoft Corporation, Redmond, Wash.

[21] Appl. No.: 335,999

[22] Filed: Nov. 8, 1994

[51] Int. Cl.$^6$ .................................................. G06F 17/30
[52] U.S. Cl. ............................................ 395/765; 395/603
[58] Field of Search ............................... 395/148, 149, 395/155–161, 600, 500, 415, 421.06; 364/401, 408, 419.19, 419.13

[56] References Cited

U.S. PATENT DOCUMENTS

| | | | |
|---|---|---|---|
| 4,912,629 | 3/1990 | Shuler, Jr. ............................. | 395/600 |
| 5,119,465 | 6/1992 | Jack et al. ............................. | 395/500 |
| 5,231,577 | 7/1993 | Koss ...................................... | 364/419.01 |
| 5,280,575 | 1/1994 | Young et al. ........................... | 395/148 |
| 5,295,256 | 3/1994 | Bapat ..................................... | 395/500 |
| 5,312,478 | 5/1994 | Reed et al. ............................ | 395/148 |
| 5,317,686 | 5/1994 | Salas et al. ........................... | 395/157 |
| 5,519,861 | 5/1996 | Ryu et al. .............................. | 395/600 |

OTHER PUBLICATIONS

Bruce, "Spreadsheet Showdown", Computer Shopper v14 n5, pp. 496–508. May 1994.
Anonymous, "Lab Test: Advanced Spreadsheets", PC User n228, pp. 104–121. Feb. 1994.

Primary Examiner—Joseph H. Feild
Attorney, Agent, or Firm—Jones & Askew

[57] ABSTRACT

A method and system wherein data elements in cells of a spreadsheet may be assigned character attribute information, such as font type, font size, bold, italics, underline, etc., wherein the character attribute information is referred to as a format. Format information is stored in a font palette table. Each cell in the spreadsheet is identified by a unique identifier that includes a row identifier and a column identifier. A direct cell format (DCF) table stores an index into the font palette in association with the unique cell identifier. When a cell is to be displayed, the system looks up the stored index in the direct cell format table, retrieves the format information from the font palette, and applies the format to the cell data elements. When a new format is created, the system determines if the format is already extant. If so, the index to the extant format is stored in the direct cell format table. A wild card character stored as a row identifier or column identifier indicates that the entire column or row, respectively, has the same format. Character format information is not stored in individual cells, and cells may share the same format combinations by merely setting the cell index to point to a desired format information in the font palette.

46 Claims, 10 Drawing Sheets

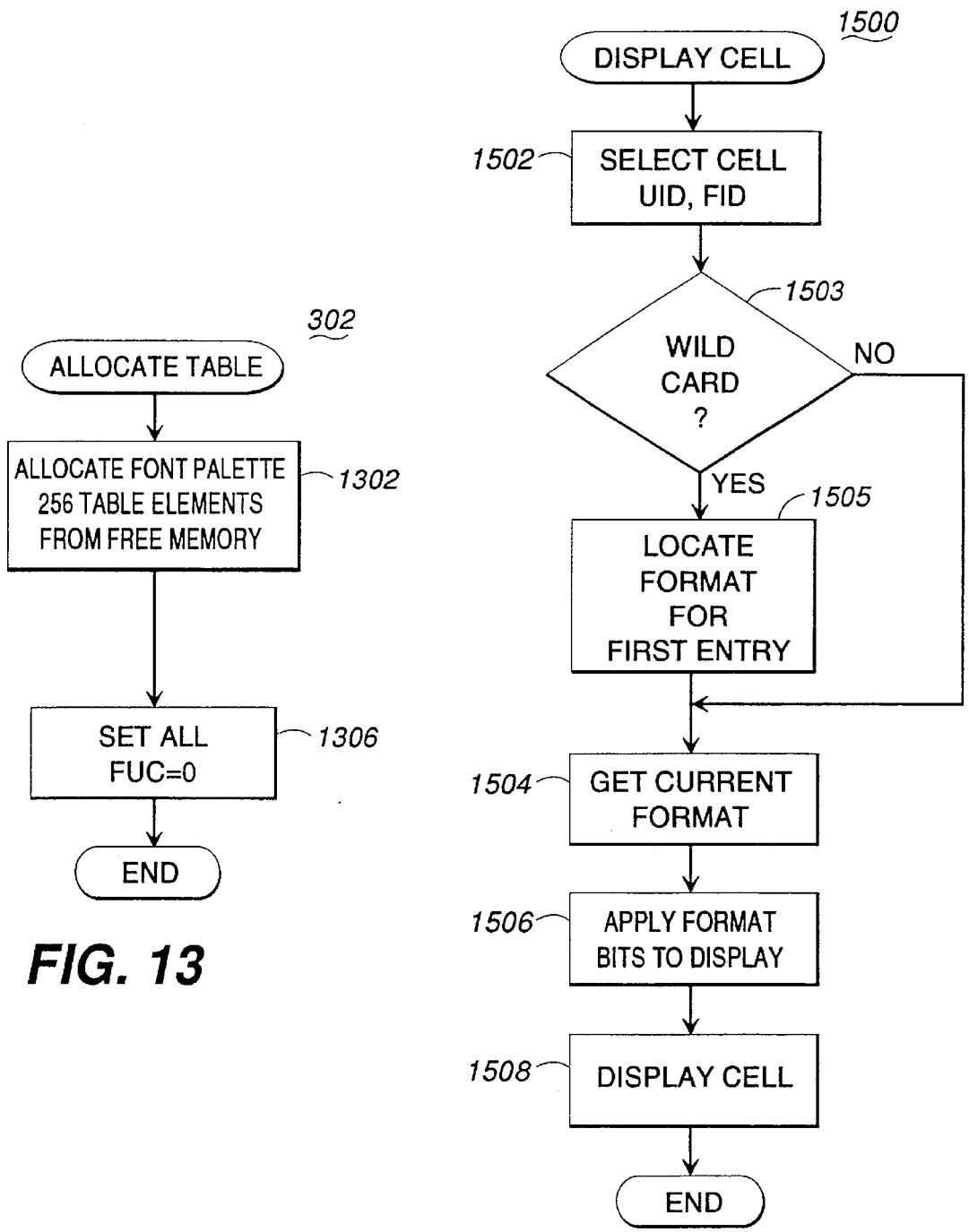

METHOD AND SYSTEM FOR DIRECT CELL FORMATTING IN A SPREADSHEET

TECHNICAL FIELD

The present invention relates to the field of computer systems, and more specifically, to a method and means for enhancing the performance of a spreadsheet application, particularly a project management type spreadsheet.

BACKGROUND OF THE INVENTION

Spreadsheets are a well-known means for processing numeric information wherein particular cells in the spreadsheet may be related with known mathematical relationships. An example of a spreadsheet application is the EXCEL spreadsheet, available from Microsoft Corporation. Basic spreadsheet-type programs have been extended to other applications, for example project management types of computer programs such as the Microsoft PROJECT application program. In project management type programs, the cells of the spreadsheet contain information related to a task or a resource allotted to a task. For purposes of this discussion, the term "spreadsheet" will be used for both numeric-oriented types of applications as well as project management-oriented or other types of applications.

Many computer application programs have the ability to display an expanded array of cell border, background, and character attribute information wherein data is displayed to the user with the same format attributes in which printed data will appear. For example, characters may typically be printed with any of a number of fonts wherein characters may be bold, underlined, italicized, centered, etc. Similarly, individual cells may be displayed with various borders and background colors.

In prior spreadsheet applications, format attribute information was stored in memory. Therefore, for each spreadsheet cell, several bytes of information were required. For example, for each character, individual data bytes were required for the character data values, as well as for attribute information, such as fonts; and position enhancements as mentioned above, e.g., superscript, centered, left justified, etc.; and appearance or "style", such as bold and italics. In prior systems, where relatively small amounts of data were processed, this arrangement provided acceptable performance and utility. However, as computer systems have become more sophisticated, the size and complexity of programs has increased dramatically. The increased amount of data processed in applications such as spreadsheets, coupled with the desirability of providing enhanced character attributes, has rapidly increased the memory needed to support an application. Therefore, techniques which improved speed, efficiency and performance of computer application programs have become increasingly important.

There are two particular difficulties in display formatting for spreadsheet type applications—memory usage considerations and performance considerations. In the Microsoft PROJECT application, as many as 10,000 different tasks and resources can be tracked in a project. Each task can have 114 fields associated therewith, thereby generating over a million data entries (114×10,000=1,114,000). Even if a project data file only utilized 10 bytes per entry for formatting information, more than 10 megabytes of memory would be required. But even 10 bytes per entry is insufficient when considering that a font name, font size, styles, color, etc. must be accommodated.

The large amounts of data that must be handled also raise performance issues. In a project management type spreadsheet, a task can be moved around, and it is generally desired that the task retain its formatting rather than adopt the formatting of a location to which the task is moved. Each time a cell is "painted" in the spreadsheet (e.g. by displaying the data on a display screen in response to a screen updating event such as screen resizing, screen repositioning, etc.), the computer system must locate the data and formatting information for the cells to be displayed, which will not necessarily be in a sequential order. Thus, a search of some type must be employed to find the data and formatting information.

One approach to improved handling of formatting information in a spreadsheet is described in U.S. Pat. No. 5,231,577 to Koss, which assigned to the same assignee as the present invention. In this patent, the formatting information is stored in an extended format table comprising a linked list of extended format combinations. When a new extended format combination is created, its position in the extended format table is calculated according to a predetermined hash function. If two extended format combinations hash to the same location, the conflicting extended format is placed in an overflow table. Each cell in the spreadsheet contains an internal index which references a cell to an entry in the extended format table. Character format information is not stored in individual cells, and cells may share the same format combinations by merely setting the cell index to point to a desired format combination.

While this arrangement results in improvements because less memory is required, in certain cases a search of a data array using a hash function take a long time, resulting in display screen refresh delays which are annoying to users. Use of a hash function for searching requires handling of possible duplicative results of the hash function, hence the provision of the overflow table. In degenerate cases, a search with a hash function might required as many memory accesses as there are entries in the table.

The approach to formatting shown in the referenced '577 patent does not permit a task or column of fields to be moved yet retain the original formatting. If a row or column of data in many numeric oriented spreadsheets is moved from one location to another (which is a common operation in spreadsheets), the moved row or column adopts the formatting associated with the region into which it is moved, e.g. if row 3 is moved to row 15, row 3 becomes row 15 and takes on the formatting of row 15; the original formatting for row 3 is lost. As mentioned, for a project management type application, it is generally preferred that a moved row or column maintain the associated formatting if the row or column is moved.

A critical performance characteristic of spreadsheet type applications is the "refresh" time, that is, the speed with which the program can repaint the display screen after a user command is issued or an internal refresh-triggering event occurs. Although the use of a separate format table, as in the above-mentioned '577 patent, is a significant step toward memory savings in spreadsheet type application, there is room for further improvement in the speed for retrieving data and formatting information for output to a display device such as a display monitor. Moreover, since the '577 patent provides no mechanism for memory savings when formatting is to be applied to an entire row or column, there is room for further improvement in memory usage of formatting features in spreadsheet and other types of applications.

SUMMARY OF THE INVENTION

Briefly described, the present invention contemplates a method and system wherein characters in cells of a spreadsheet may be assigned character attribute information, such as font type, font size, bold, italics, underline, color, etc., wherein the character attribute information is referred to as a "format". According to the principles of the present invention, operating system font descriptors and other character attributes such as style and color (which can be many bytes in size) are stored in a font palette, referenced by a single 8-bit index. Cell formatting information for each cell is stored in a direct cell formatting (DCF) array, which stores an index or pointer into the font palette. In this manner, each format that is used in the worksheet need only be stored once in the font palette, and the data required to obtain the formatting information is reduced to a single 8-bit byte (as opposed to 40+ bytes for each cell if the entire font descriptor and other attributes had to be stored).

Each cell in the DCF array contains an internal index pointer that references a cell to an entry in the font palette. Therefore, character format information is not stored in individual cells, and cells may share the same format combinations by merely setting the cell index pointer to point to a desired format in the font palette. The present invention dramatically reduces the memory requirements for the application by completely eliminating redundant character attribute combinations and dramatically increases the efficiency of the application by eliminating the need for reading character attribute information from each individual cell.

In prior spreadsheets such as that shown in the '577 patent, space must allocated for storing the index for each cell. Thus, memory requirements (space usage) for a spreadsheet constructed in accordance with the disclosure of this patent are much larger than in the present invention.

Further, the present invention provides for a wild card character that signifies that an entire row or column of the worksheet is formatted alike. Users typically will select entire rows or columns and apply the same format to all cells within. When a full column is selected, instead of storing a unique identifier, the present invention provides for storing a wild card character, and only one formatting entry for the entire column. When the system is operative for checking a particular cell to see if it has any formatting and find none in the index (or find the wild card in the place of a row or column identifier), the system then refers to the initial entry for that row or column. Only one formatting entry is therefore stored for the entire row or column, thereby producing savings in both memory usage and time.

In the invention, data entries and formatting information is stored in a large array of entries. Rather than "walking" through each entry in the arrays, comparing the task identifier and field identifier of the cell of interest to the identifiers for each cell in the array to locate data and formatting information (which is too time consuming), the arrays are sorted based first on a unique identifier of the task (or resource) and then on a unique identifier for the field. This structure permits location of the data and formatting information for a cell of interest for over a million entries with only 20 comparisons utilizing a binary search.

When displaying cells on a computer apparatus utilizing the present invention, the computer system is operative to determine a group of cells that is displayed on a display means, by identifying particular rows and columns of information that are visible and to be displayed. The computer system carries out the disclosed method, for each cell that is displayed, of locating an entry in the direct cell formatting array corresponding to a particular cell to be displayed utilizing a binary search based on a row identifier (task ID) and a column identifier (field ID), and retrieving the index associated with the particular cell to be displayed from the direct cell formatting array. If the binary search indicates that the wild card character is stored in either the row identifier or column identifier for the particular cell of interest, the font palette index for the initial entry of that entire row or column, as appropriate, is retrieved. Otherwise, the font palette index associated with the row identifier and column identifier of the particular cell is retrieved as a result of the binary search.

The retrieved font palette index is utilized to obtain formatting information for the cell of interest from the font palette. The formatting information is retrieved from the font palette and imposed upon the data from the cell of interest, to cause the data to be displayed with the desired formatting.

Accordingly, it is an object of the present invention to provide a method and means for increasing the efficiency of a computer application program which provides the capability to display and print cell font, style, and color attribute information.

It is another object of the present invention to provide an improved method and means of reducing memory storage requirements in a computer spreadsheet application.

It is still another object of the present invention to provide an improved spreadsheet application wherein character attributes e.g. font, style, and color may be assigned to any number of cells without significantly increasing the memory requirements of the application.

It is another object of the present invention to provide a display formatting method and system wherein a task or column of fields may be moved while retaining their formatting information.

These and other objects may be completely understood through the detailed description of the invention below and the accompanying figures of drawings.

BRIEF DESCRIPTION OF THE DRAWINGS

FIG. 13 is a flow diagram of the allocate DCF table routine invoked by the routine of FIG. 3.

FIG. 14 is a flow diagram of the routine invoked to display cells.

DETAILED DESCRIPTION OF THE PREFERRED EMBODIMENTS

The present invention provides an improved methods and structure for application programs wherein cell formatting information may be associated with cell borders, backgrounds, and characters, or groups of characters, without significantly increasing the memory requirements of the application. In accordance with the present invention, characters or groups of characters may be displayed and printed with any of a number of attributes, such as font type, font size, color, italics, underlining, bolding, etc. For example, characters or groups of characters may be displayed with character formats, such as Times Roman, ten point, bold and italics, or Helvetica, fourteen point, bold and underlined, etc. Similarly, individual cells may be displayed with various borders and background colors.

In prior systems, cell format information was attached to individual cells. Therefore, individual cells included numerous format descriptors, which in many cases, doubled the data required to describe each cell. In contrast, the present invention provides a compact structure wherein cell formatting information is stored in a font palette, which is accessed by an index stored in a direct cell formatting (DCF) table, which is composed of an array of table entries. Instead of providing cells with imbedded format information, the cells to be displayed are identified by a unique identifiers comprising a task or resource ID (UID) and a field ID (FID) within a given task or resource.

Separate program elements, not described herein, are utilized to maintain a record of the selected cells that are displayed on the display screen. When a display screen refresh event occurs, the cell identifiers are used to conduct a binary search on (a) a sorted data array that contains the data to be displayed, and (b) a sorted DCF array that contains the formatting information. The binary search allows rapid location of data to be displayed and its associated formatting.

The DCF array contains an index or pointer to an entry in a separate font palette, which is composed of an array of table entries. Each table entry directly refers to a 2-byte font descriptor or "font handle" in the preferred WINDOWS™ operating system, plus style and color information. Therefore, the cell attribute information for each cell is defined only once (in the font palette), wherein cells that have common character formats merely share common pointers from the DCF array into the font palette, thus eliminating redundant cell format descriptions. For the purposes of this description, a "cell" may be defined as a region having a background, borders, at least one data field, and, in some cases, a description of its relationship with respect to other cells.

Figure 1:
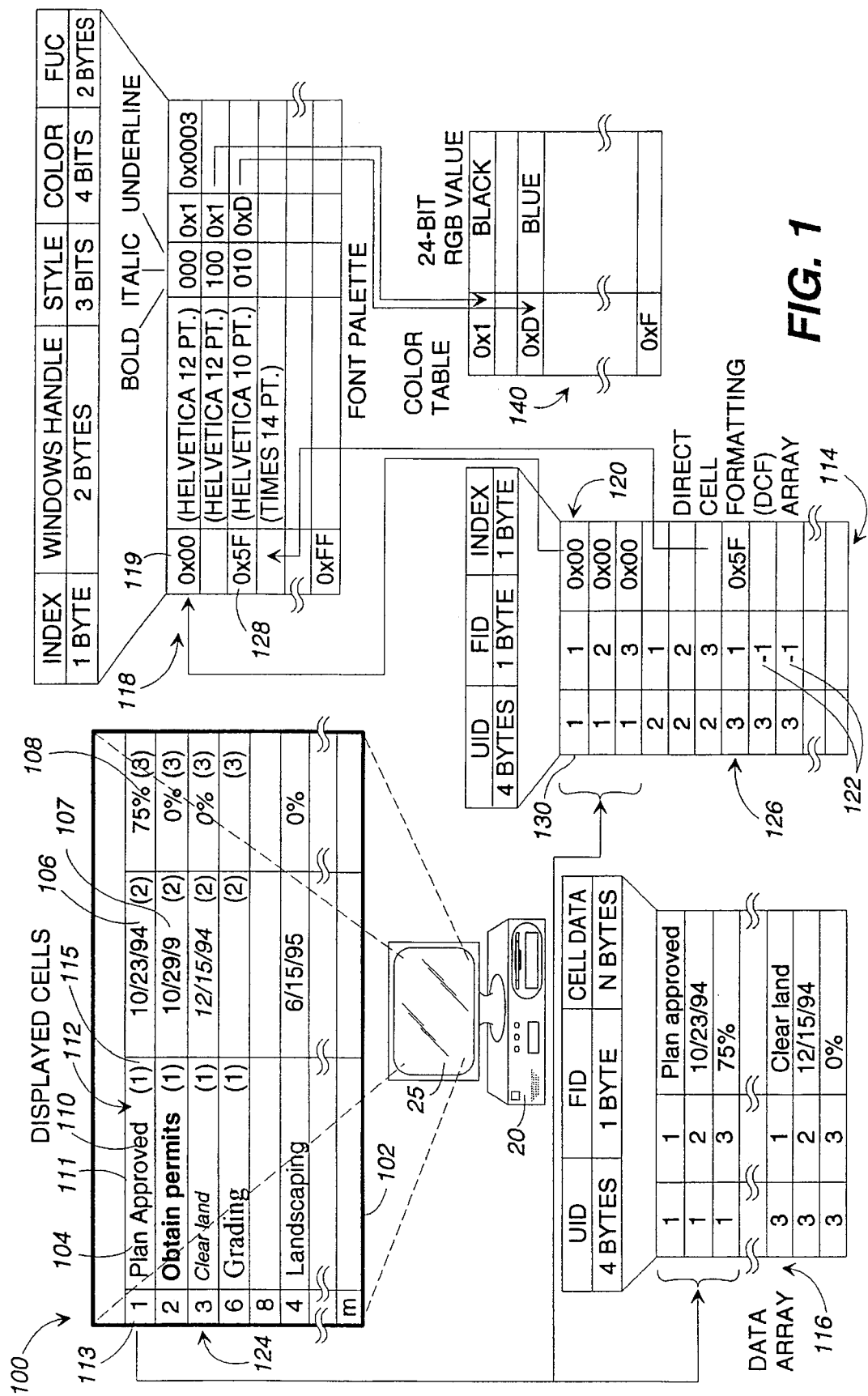
FIG. 1 is a diagram of the improved structure of the computer spreadsheet application of the present invention, illustrating the principles of the invention.

Referring now to FIG. 1, the structure of the improved spreadsheet application of the present invention is shown. Spreadsheets are a well-known type of computer application program wherein the computer apparatus 20, under the control of the spreadsheet application, is programmed to display on a display screen such as a computer monitor 25 and modify data based on predefined relationships between respective cells, e.g. mathematical relationships between cells or relationships between tasks and resources. While the preferred embodiment of the present invention is disclosed in the context of a computer spreadsheet application, those skilled in the art will appreciate that the principles of the present invention may be applied to virtually any type of computer program which incorporates formatting or attribute information.

It is noted that conventional hexadecimal notation is used throughout this description and in the drawing figures, e.g. 0xN indicates a 4 bit value and 0xNN indicates an 8 bit value, where N is either 0, 1, 2, 3, 4, 5, 6, 7, 8, 9, A, B, C, D, E, or F.

The preferred embodiment comprises a computer application program or system 100, operative to run on a computer apparatus 20 comprising a central processing unit, main memory, permanent read/write memory (hard disk, floppy disk, etc.), keyboard, and mouse. Such elements of a computer apparatus are known to those skilled in the art and will not be described further herein. As is also known, the computer apparatus is operative to cause the display of graphic elements on a computer monitor or display screen 25. The graphic display on the display screen 25 is the result of a user's interaction (via the keyboard and mouse) with an application program and computer operating system software running on the computer apparatus. The display screen 25 typically displays one or more "windows" or "views" of information stored in the computer, which information can be processed, manipulated, stored, communicated, etc. with the computer apparatus.

In the present invention, it will be understood that the display appearing on the display screen 25 is the result of operation of a system 100 comprising a spreadsheet type application program. The results are displayed as a worksheet or spreadsheet 102, comprising a plurality of cells arranged in an array as shown in FIG. 1.

In the system 100, a worksheet or spreadsheet 102 array include exemplary cells 104, 106, 108, which are organized in a plurality of rows (1, 2, ... m) and a plurality of columns (1, 2, ... n). Each spreadsheet cell in the system 100 comprises a character field, e.g., character field 110; a border region, e.g., border region 111; and a background region, e.g., background region 112. In the disclosed project management type spreadsheet application, a cell is identified by a unique identifier, comprising a task unique ID (UID) e.g. UID 113 and a field ID (FID) e.g. FID 115. These identifiers determine an address in a direct cell formatting (DCF) array 114 and a data array 116. The cell identifiers identify an entry in the DCF array 114, which includes an index, e.g. index 117, that points to a particular cell format in a font palette 118.

Note in FIG. I that tasks 1, 2, 3, 6, and 8 are shown, while tasks 4 and 5 are missing from the sequence (task 4 appears below task 8). In the present invention, a separate program task not described herein keeps track of which tasks are displayed in a window or region such as the spreadsheet 102. Cells need not be displayed in sorted numeric order, since the user is permitted to rearrange the tasks and fields. Since the cell identifiers are maintained uniquely, there can be a display of cells that skip certain tasks (e.g. task 4 appears after task 8; task 5 is not shown and may have been deleted). Thus, the present invention is operative to receive a list of cells (tasks and associated fields) to be displayed from other means, to retrieve the appropriate data and formatting information, and write the formatted data to display memory for display.

According to the principles of the present invention, the cell identifiers UID, FID point to unique format combinations, e.g., cells 104, 106 in the DCF array 114 having indices that point to unique entries in the font palette 118, or may share format combinations, e.g., cells 106,107 having indices that point to the same entry 119 in the font palette 118. The font palette 118 stores the following information: an index (2 bytes), a full WINDOWS™ font descriptor or handle (2 bytes), and a font usage count (FUC) (2 bytes).

The DCF table or array 114 is a sorted two-dimensional array that is searched utilizing a binary search. In the preferred practice of the present invention, each entry in the DCF table contains 3 fields which are as follows:

UID (4 bytes) These bytes indicate a unique task or resource identifier.

FID (1 byte) This byte indicates a particular field of a given identified task or resource identifier.

Index (1 byte) This byte indicates one of 256 possible different formats in the font palette.

The font palette 118 is a sorted array that is indexed by the index in the DCF array, and contains five fields as follows:

Index (1 byte) This byte indicates one of the 256 possible locations in the font palette.

FH (2 bytes) Font Handle. This field contains the WINDOWS font handle or descriptor, e.g. Helvetica 12 pt, in a code as specified by the WINDOWS™ vers. 3.1 computer operating system, manufactured by the assignee of the present invention, the programmers' manuals and technical specifications for which are incorporated herein by reference and made a part hereof.

Style (3 bits) This indicates font attributes such as bold, italic, underlined, etc.

Color (4 bits) This indicates font attributes such color. Up to 16 different colors may be specified, of a possible color palette of 16 million different colors (for 24 bit color, with three 8-bit bytes for each of red, green, and blue). The Color bits point to one of 16 possible colors stored in a color table or array 140, which stores 24 bit RGB values in association with one of the sixteen possible values of the four Color bits.

FUC (2 bytes) Format Usage Count. This field stores a 16 bit number indicative of the number of usages of the particular format. If the usage count reaches zero, the format is not used and may be deleted when saving or restoring the file.

In the preferred practice of the present invention, the DCF table 114 is a C++ language struct whose size varies as a function of the data contained in the worksheet. When memory for the DCF table 114 is first allocated, a default format 120 is installed in at least one entry in the DCF table. In the disclosed embodiment, an index 0x00 points to the first index entry 119 in the font palette 118, indicative of the Helvetica 12 point font, with 000 as style bits (no bold, no italic, no underline), with 0x1 color (black).

A color table 140 is also provided in the present invention. In the preferred embodiment, an array of 16 entries is provided, allowing 16 different colors to be specified by a user. The color table stores 24 bit color values for a selected color (which is determined by color selection means not forming a part of the present invention), and stores these color values in one of the 16 possible locations. The four bit Color index stored in the font palette is used to retrieve one of the sixteen possible color values, and write this color value into display memory when the system is operative to display formatted cell data in accordance with the present invention.

The present invention further includes the use of a "wild card" entry in the DCF array 114, e.g. wild card entries 122, which indicate selection of the same predetermined format for an entire row or column. Users often desire to select the same formatting for all entries associated with a given task (e.g. all fields of that task), or for all fields of the same type (e.g. the "start" field of all tasks). A wild card entry in either a UID or a FID signifies that a prior formatting applies to all items of similar character. In FIG. 1, note that task 3 124 on the spreadsheet display screen has data in three fields, Name (task 3, field 1) =Clear land, Start (task 3, field 2)=Dec. 15, 1994, and % Complete (task 3, field 3)=0%, with all data in italics. In accordance with the invention, the identifier for task 3 is associated with the entry 126 in the DCF array 114. The entry 126 contains index 0x5F. Index 5F, for example, points to entry 128 in the font palette, Helvetica 10 point font, style 010, color 0xD. Style 010 indicates not bold, italic, not underlined. Color 0xD indicates blue.

The wild cards 122 in the DCF array associated with (task 3, field 2) and (task 3, field 3) are "−1". Therefore, a retrieval into the DCF array for the format associated with the data in the data array for (task 3, field 2)=Dec. 15, 1994 and (task 3, field 3)=0% retrieves the "1" wildcard, indicating that a prior format associated with task 3, e.g. (task 3, field 1 ), index 0x5F, style 010, color 0xD, has been selected for all fields associated with task 3.

Figure 2:
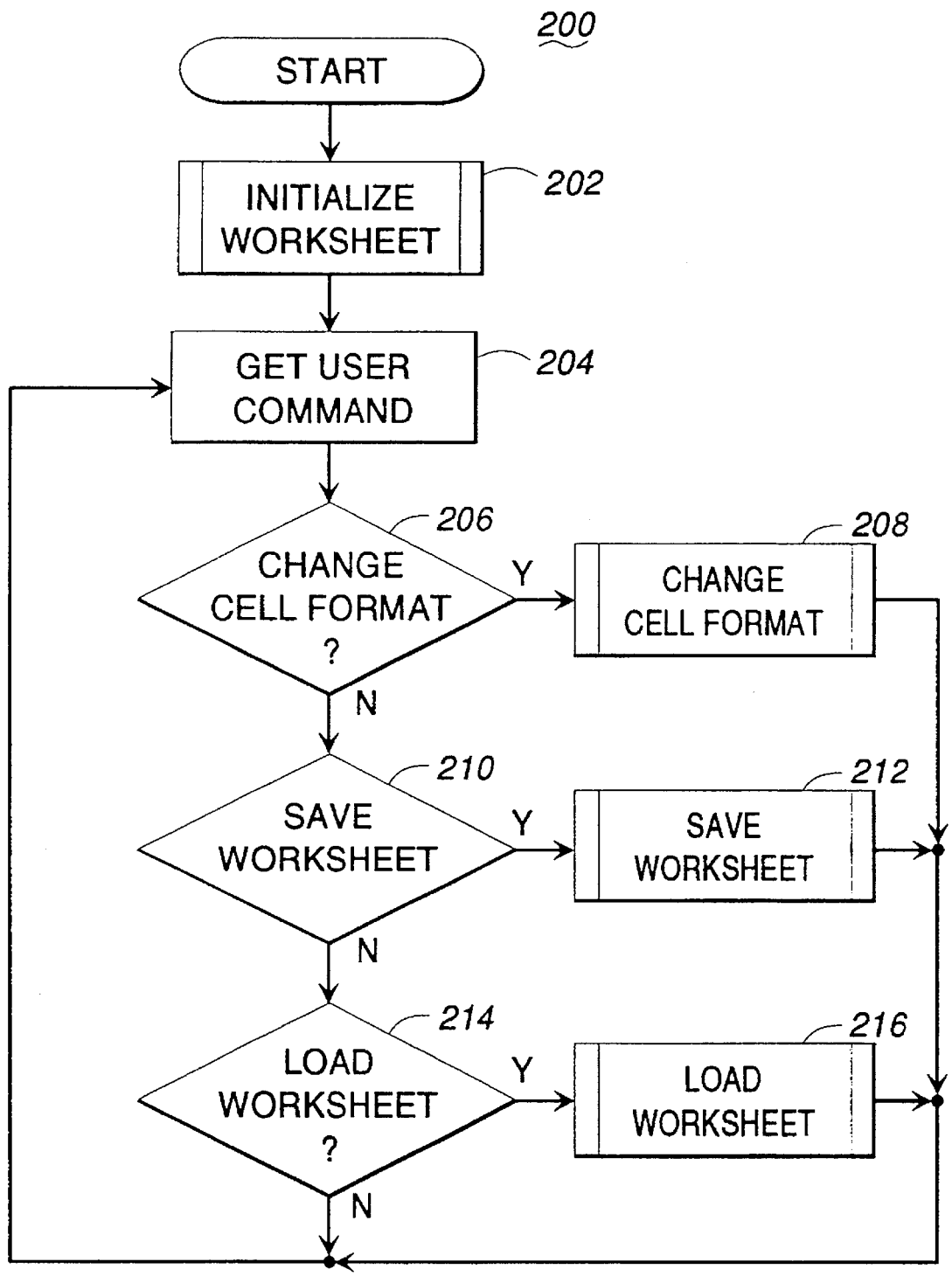
FIG. 2 is a flow diagram of the overall functional operation of the present invention.

Referring now to FIG. 2, whenever the system 100 is first activated, process 202 is invoked to initialize a spreadsheet or project worksheet. Once initialized, control passes to item 204 to wait for a user command. When a user input is received, the command is tested by decisions 206,210 and 214, wherein control passes to process 208 if a "change cell format" command is detected; control passes to process 212 if a "save worksheet" command is detected; and control passes to process 216 if a "load worksheet" command is detected. Once a desired task is completed, control returns to item 204 to wait for the next user command.

Figures 3, 4:
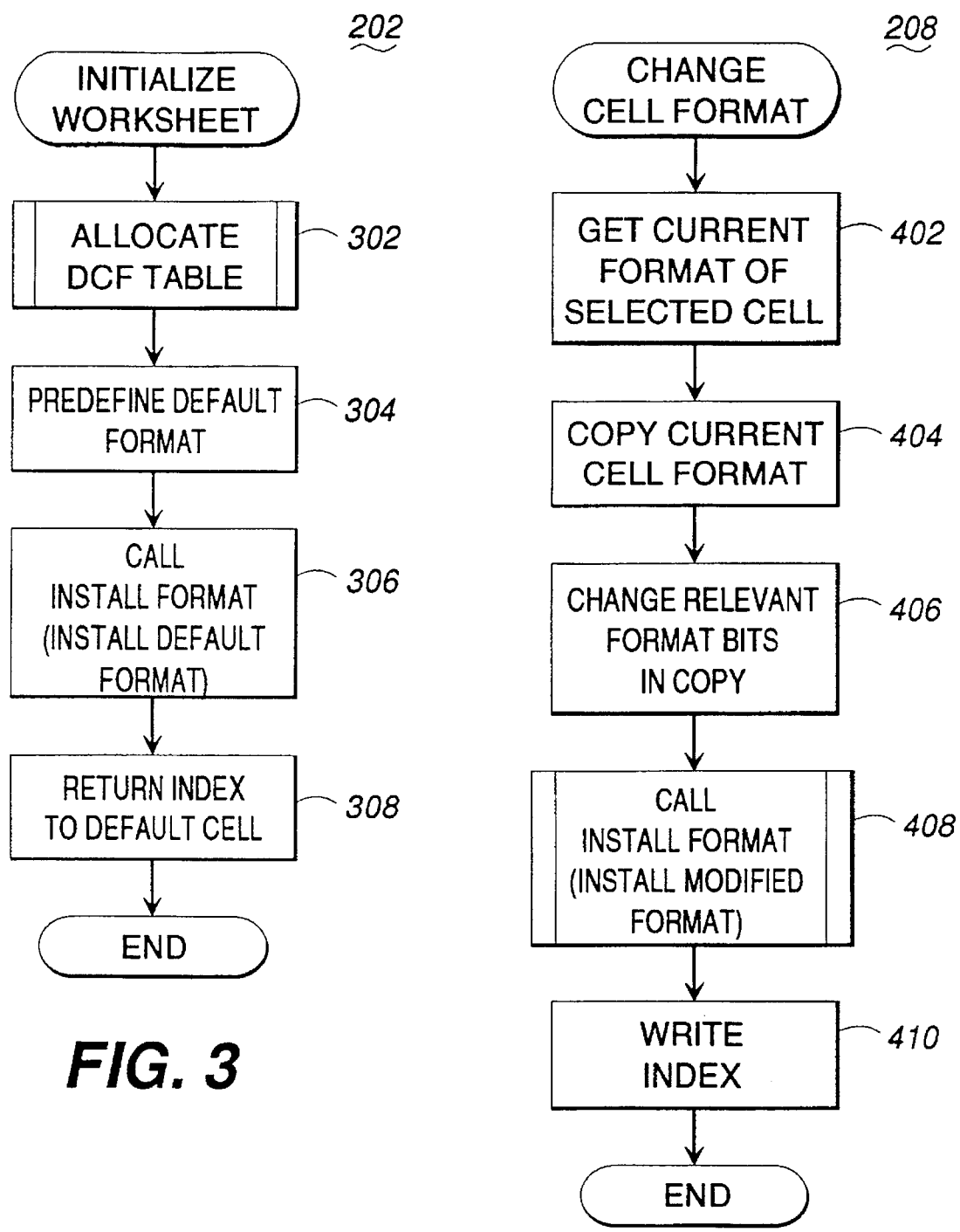
FIG. 3 is a flow diagram of the routine invoked to initialize a spreadsheet.
FIG. 4 is a flow diagram of the routine invoked to change cell formats in the spreadsheet application of FIG. 1.

Referring now to FIG. 3, process 202 is invoked to initialize a worksheet. When invoked, the process 302 is called to allocate the DCF table 114. Control then passes to step 304 to recall a default format for a cell, e.g. format 120 in FIG. 1. In the preferred practice of the present invention, the default format 120 comprises a font type of Helvetica, 12 point, plain style, and a cell type of no borders, black color, etc. Step 306 then installs the default format 12 0 in the DCF table 114 with an "InstallFormat" routine, and establishes an index 117 of 0x00 into the font palette 118. Control then passes to item 308 to return the index to the cell.

Referring now to FIG. 4, the process 208 is invoked to change a cell format for a selected cell. This process presupposes that the selected cell, e.g. cell 104 (task 1, field 1 ) is currently displayed on the display screen. When invoked, item 02 fetches the current cell format by utilizing the UID, FID to conduct a binary search within the DCF array 114 to locate the corresponding entry, e.g. entry 130 in FIG. 1. The index 117 in the entry 130 then points to the corresponding format descriptor in the font palette 118, e.g. index 119 0x00, indicating Helvetica 12 point, no bold, no italic, no underline, color black.

Step 404 then copies the current cell format into a temporary location. Control then passes to item 406 to change the relevant bits in the format of interest. Process 408, an "InstallFormat" routine, is then invoked to install the modified extended format in the DCF table 114 and to generate a new index for the modified cell that points to the appropriate location in the font palette 118, if the font was changed, and/or to modify the appropriate Style bits or Color bits in the entry. Step 410 writes the index 117 in the entry of interest if it has been modified.

Those skilled in the art will note and appreciate the use of a binary search in the present invention for locating cells of interest to be changed, displayed, etc. It will be recalled that in the disclosed project management type spreadsheet application, the data entries to be displayed on the display screen are not necessarily sequential, since users can move tasks and fields around, delete or add tasks, etc. Separate program processes can result in an unsequenced, out of order arrangement of cells displayed in the window e.g. 102 in FIG. 1. When a display memory refresh event occurs, e.g. when a window is resized or moved, it is necessary to retrieve the data to be displayed and its formatting information, and write the formatted data to display memory before the screen is next painted.

Preferably, therefore, the DCF array 114 and data array 116 are maintained as sorted arrays in memory. A binary search technique, which is well known to those skilled in the art, allows rapid location of a cell of interest by successively comparing the UID, FID of a cell of interest (being looked up) to an inspected item at the half-way point in the array, determining whether the UID, FID of the inspected item is greater or lower, selecting the region above or below the inspected item (as appropriate), dividing the items in two, until the item of interest is obtained. With a binary search, slightly more than a million items (e.g. $2^{20}$) items can be located with but twenty comparisons.

Use of the binary search to obtain the data to be displayed and corresponding formatting information from the data array 116 and DCF array 114 greatly speeds up the refresh rate in spreadsheets that incorporate the teachings of the present invention.

Figure 5:
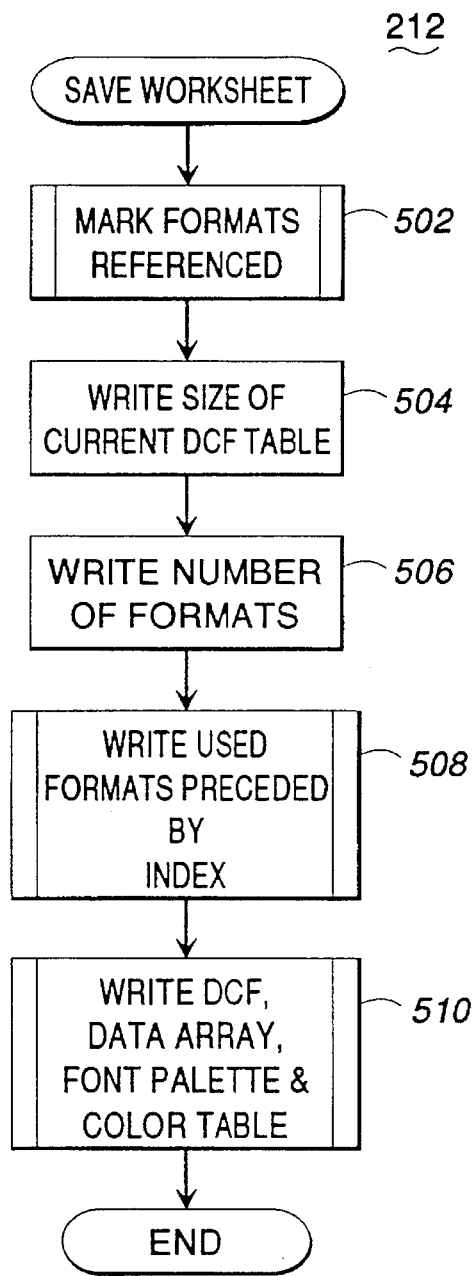
FIG. 5 is a flow diagram of the routine invoked to save a spreadsheet constructed in accordance with the present invention.

Referring now to FIG. 5, the routine 212 is invoked to save an existing worksheet which may have been modified. When invoked, process 502 first marks cells referenced to indicate which of the 256 possible formats are currently used by worksheet cells. Step 504 then saves the size of the current DCF table, and item 506 saves the number of currently used format in the font palette. Next, process 508 is invoked to save used formats preceded by the index in the font palette 118. (Unused fonts in the font palette are not saved.) Once the formats are written in the font palette, process 510 is invoked to write the data stored in individual cells by storing the DCF array 114, the data array 116, the updated font palette 119, and the updated color table 140.

Figure 6:
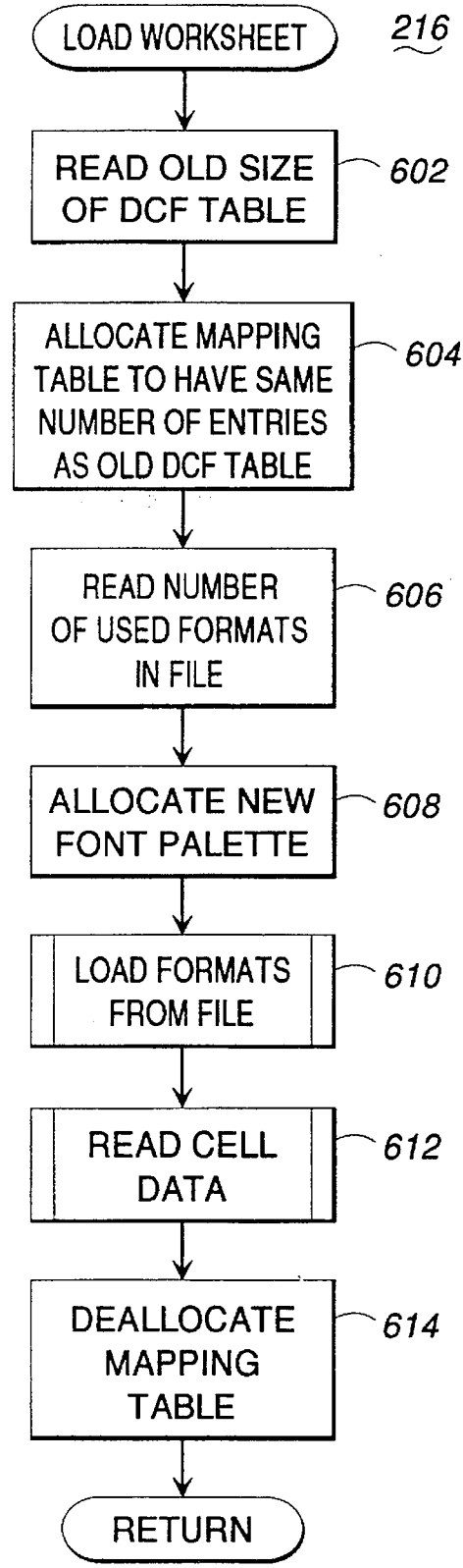
FIG. 6 is a flow diagram of the routine invoked to load a spreadsheet.

Referring now to FIG. 6, the process 216 is invoked to load an existing worksheet from a stored file. When invoked, step 602 reads the size of the stored DCF table and data array in the file, and step 604 allocates in memory a mapping table having the same number of entries as the DCF table and data array. Step 606 then reads the number of used formats in the file by reading the size of the stored font palette. Once the number of used formats is determined, step 608 allocates memory for a font palette 118 with the number of used formats. Process 610 is then invoked to load the formats into the font palette from the file of interest. Once the DCF table and font palette is loaded, process 612 is invoked to read the cell data from the file and to load the cells into a data array 116, load font palette indices into a DCF array 114, and to load cell format index, style and color into a font palette array of appropriate size. Step 614 then deallocates the mapping table.

Figure 7:
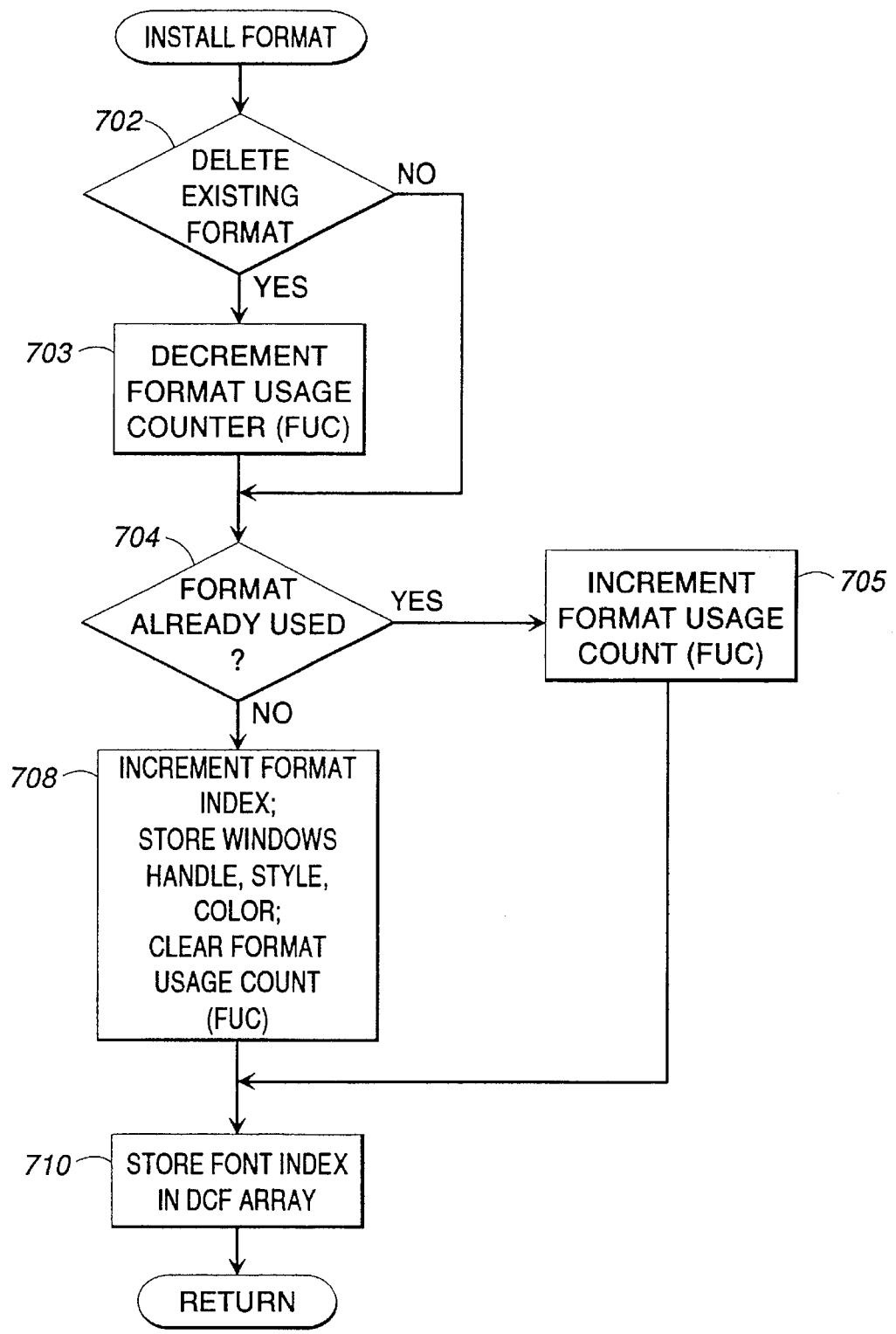
FIG. 7 is a flow diagram of the InstallFormat routine utilized in the routines of FIGS. 3 and 4.

Referring now to FIG. 7, the InstallFormat routine 306, 408 is invoked whenever a new format is created (which also includes deletion of an existing format). The routine 306, 408 determines an index for the new format into the font palette. installs the new format in the DCF table, and installs the format in the font palette 118. The overall function of the routine 306, 408 may be explained as follows. As noted above, the default DCF array is allocated with as many table positions as there are data entries in the data array 116. When a new format combination is created, an index to the corresponding WINDOWS™ font and style stored in the font palette is created, so that all cells that use this format may efficiently refer to the same format descriptor. The index to that format is stored in the DCF table.

When invoked, step 702 determines whether the calling operation has resulted in deletion of an existing format. This is carried out by comparing the old format (if there was one) to the new format. (For installing the default format, there will be no old format and the default format is installed.) If so, the format usage count (FUC) for the existing format is merely decremented at step 703. If not, a new format is indicated and must be created by skipping to step 704.

The format usage count (FUC) is used to keep tally of the number of cells that utilize a given particular format; every time a cell is formatted to use a previously-used font, style, color, etc. the usage count FUC is incremented, and every time a cell is formatted to change the format to another format, the previous format usage count is decremented. When a format usage count reaches zero, there is no more usage of that format in the spreadsheet and the format may be deleted from the font palette 118.

Step 704 determines whether the particular new format has already been used, by comparing the new format to the formats in the font palette 118. The is carried out by comparing the new format to each entry in the font palette 118. If so, the YES branch from step 704 leads to step 705, where the format usage count (FUC) for the existing format in the font palette is incremented.

After the format usage count is incremented, flow passes to step 710.

If at step 704 the new format has not yet been used, at step 708 a counter indicating the last entry in the font palette 118 is incremented and stored in the next available location in the font palette as the format index 119. The WINDOWS™ font handle, which is passed to the process 306, 408 when the routine is invoked, is stored in the font field, the appropriate Style and Color bits are set, and the associated format usage count FUC is cleared to zero.

At step 710, the format index (e.g. 119)for the newly installed format is stored in the corresponding field of the DCF array so that the index for the cell of interest refers to the entry in the font palette.

Figure 8:
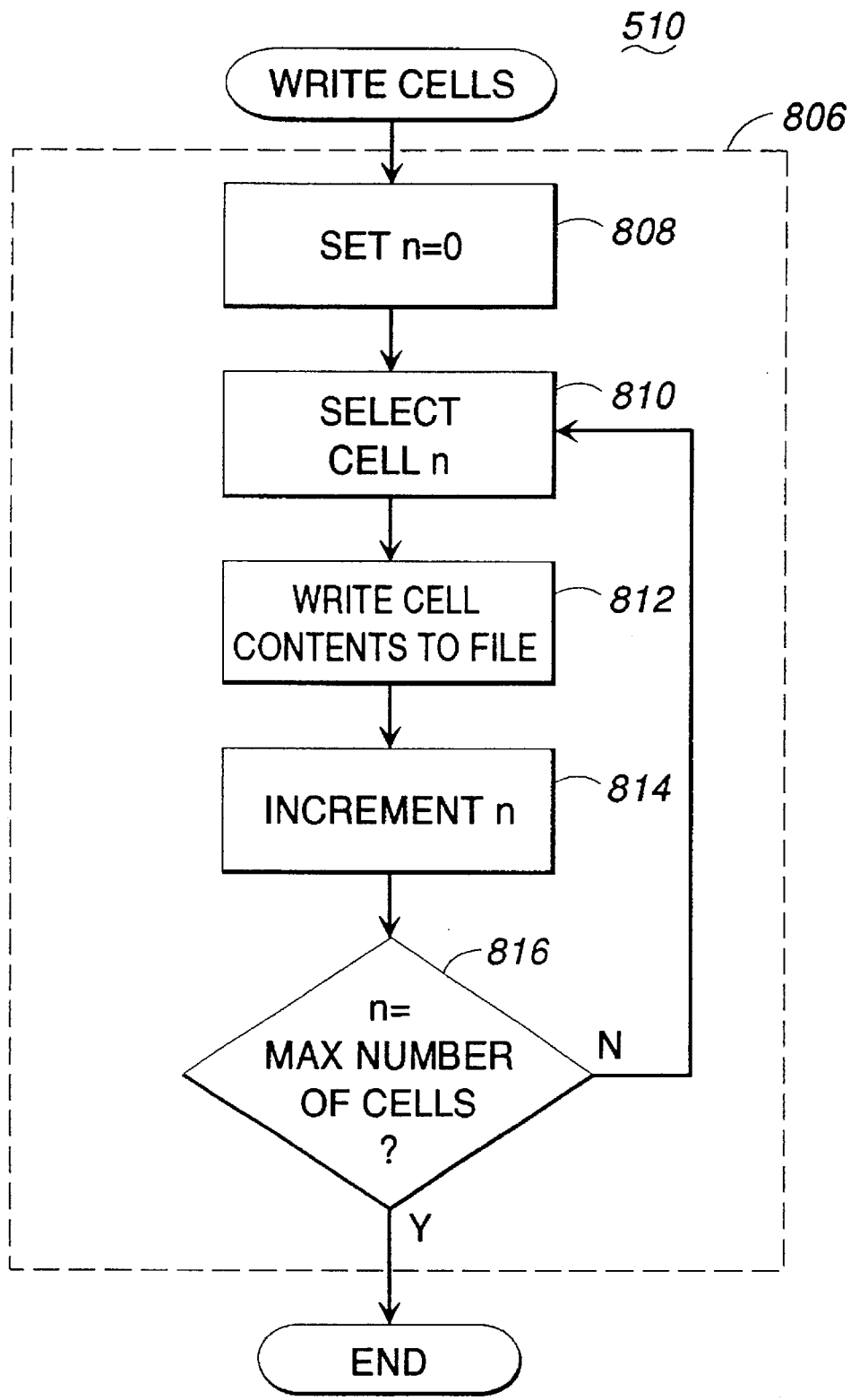
FIG. 8 is a flow diagram of the routine invoked by the routine of FIG. 5 to write cells from the worksheet during a save operation.

Referring now to FIG. 8, the routine 510 is invoked to write cells to a file when saving a worksheet. Loop 806 is entered to write the worksheet cells (including data array 116 for the worksheet, the DCF array 114, the font palette 118, and the color table 140) to a file. When loop 806 is entered, step 808 initializes a worksheet cell index to point to the first cell in the worksheet, e.g. UID=1, FID=1. Step 810 then selects the cell pointed to by the index. Control then passes to step 812 which writes the cell contents to the file. The cell index is then incremented by step 814 to point to the next cell in the worksheet. Decision 816 then determines whether the cell index is pointing past the last cell in the worksheet. If not, control returns to item 810 to select the next cell in the worksheet. Otherwise, control returns to the calling routine.

Figure 9:
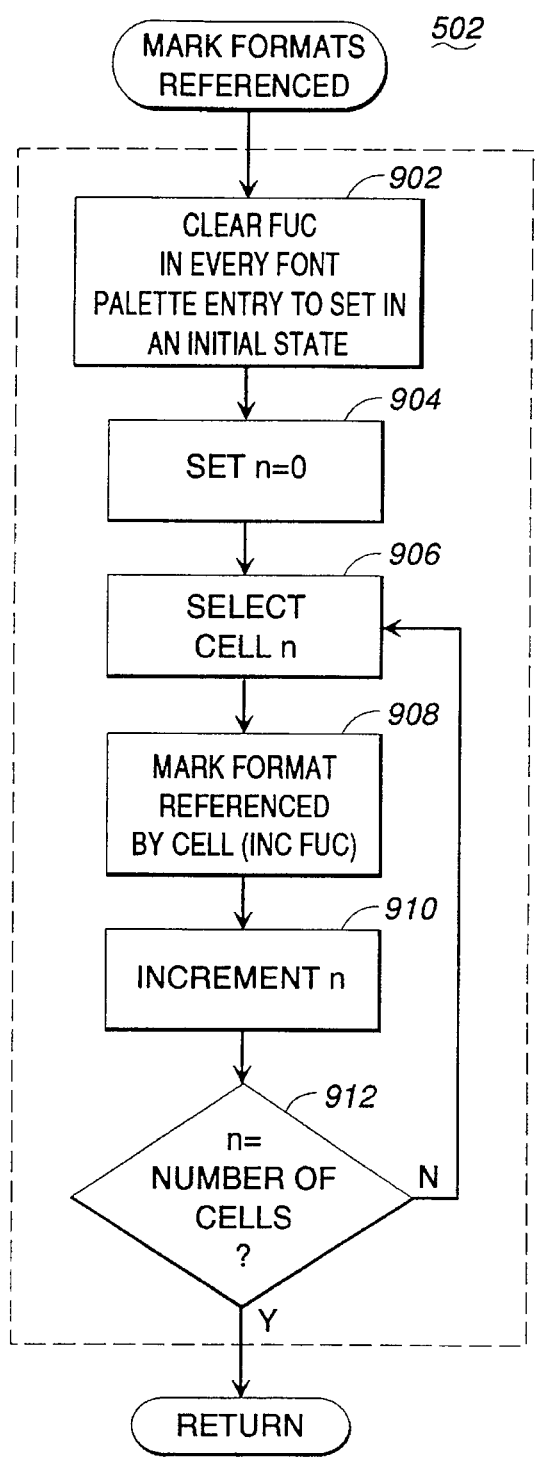
FIG. 9 is a flow diagram of the routine invoked by the routine of FIG. 5 to mark formats referenced.

Referring now to FIG. 9, the routine 502 is invoked by the routine of FIG. 5 to scan the current worksheet to determine which entries in the font palette 118 are referenced by cells in the worksheet so that only used formats are written with a file when the file is saved. When invoked, step 902 sets the format usage count in each entry in the font palette 118 to an initial state, which indicates the format entry is not referenced. Step 904 then initializes an index to point to the first cell in the worksheet. Next, step 906 selects the cell pointed to by the index. Step 908 increments the font usage count in the font palette entry of interest if the font is used. Control then passes to item 910 to increment the index. Once the index is incremented, decision 912 determines whether the index has been incremented past the last cell in the worksheet. If so, control returns to the calling routine. Otherwise, control returns to step 906 to process the next cell.

Figure 10:
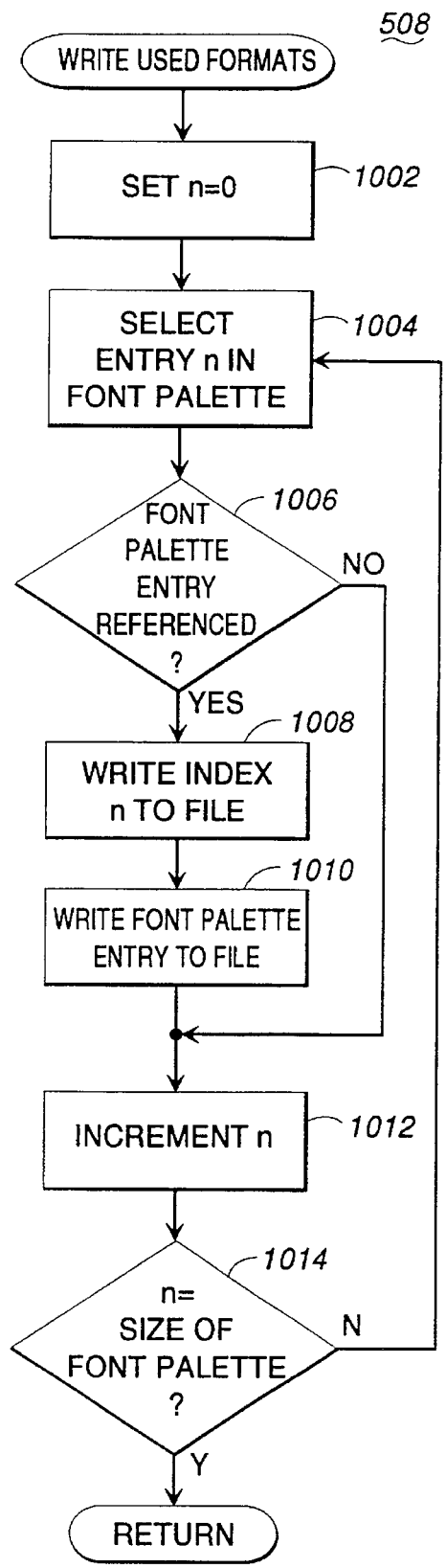
FIG. 10 is a flow diagram of the routine invoked by the routine of FIG. 5 to write used formats to a file.

Referring now to FIG. 10, the routine 508 is invoked to write used formats whenever a worksheet is saved. When invoked, step 1002 initializes an internal counter to zero wherein the counter comprises an index into the font palette 118. Step 1004 then selects the entry in the font palette pointed to by the index. Once selected, decision 1006 determines whether the font palette entry pointed to by the index is referenced by testing the font usage count in the entry. If the font usage count is zero, control passes to step 1012 to increment the index. Otherwise, control passes to step 1008 which writes the current index to the file. Step 1010 then writes the corresponding font palette entry to a file. Control then passes to step 1012 which increments the index. Next, decision 1014 determines whether the index has been incremented past the last entry in the font palette. If not, control returns to step 1004 to select the next entry in the font palette. Otherwise, control returns to the calling routine.

Figure 11:
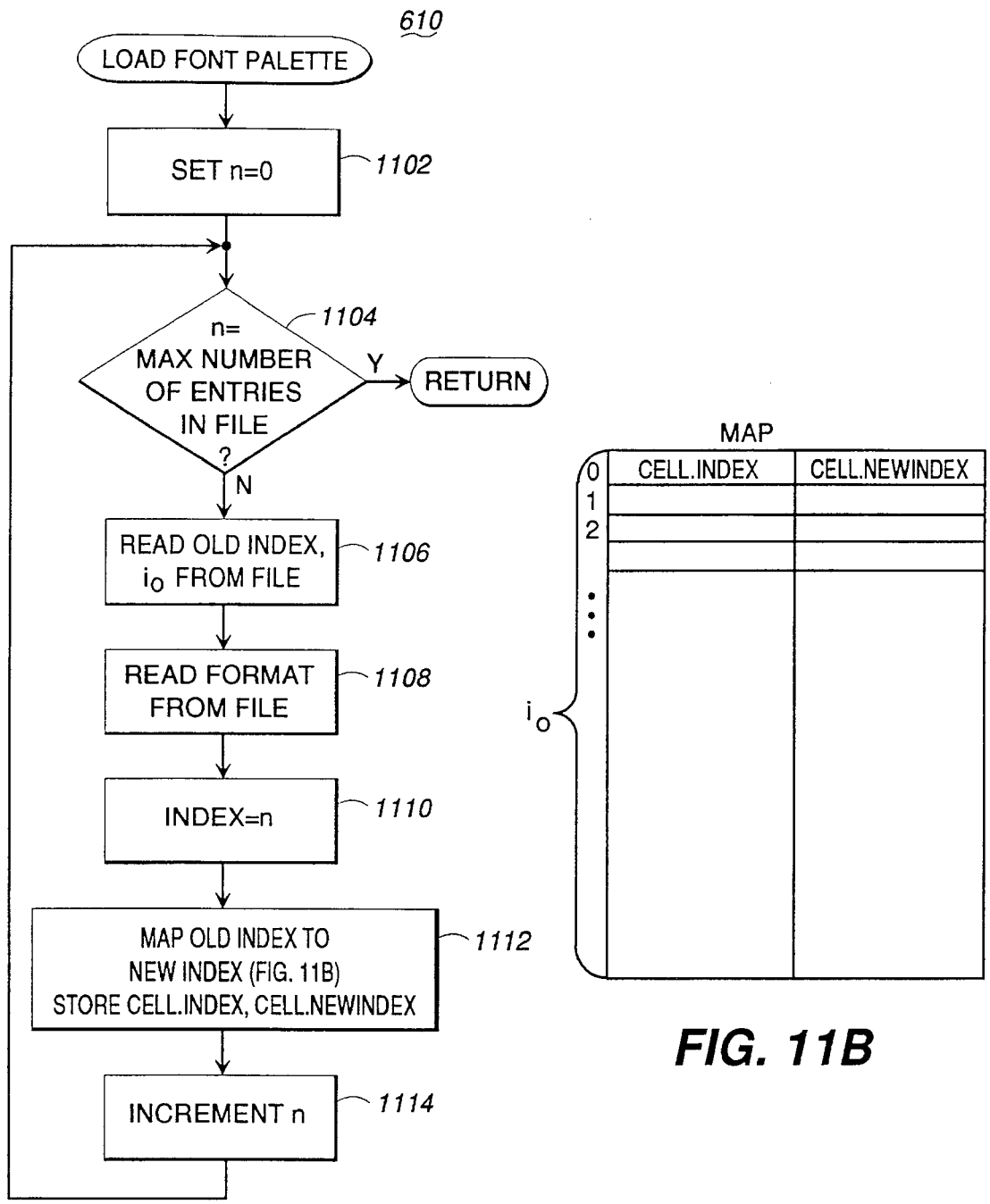
FIG. 11A is a flow diagram of the routine invoked by the routine of FIG. 6 to load formats from an existing file.
FIG. 11B is a diagram of a mapping table used for mapping an old font palette to a new font palette.

Referring now to FIGS. 11A and 11B, the routine 610 is invoked to load the DCF array and font palette entries from a file when opening a worksheet. During this process, previously used formats may no longer be referenced. Therefore, one function of routine 610 is to recalculate the indices for currently referenced font palette entries and to update the index entries in worksheet cells in the DCF array 114 to point to the proper entries in the font palette 118.

When routine 610 is invoked, step 1102 initializes a counter n into the font palette entries stored in the file; decision 1104 then determines whether the value of the counter is equal to the maximum number of table entries in the file (a maximum of 256). If so, routine 610 returns to the calling routine. Otherwise, step 1106 reads the old index from the file. Step 1108 then reads the index value, associated WINDOWS™ font handle, and usage count FUC from the file. A new index is generated in step 1110 making the value of the index equal to the value of the counter n. The new index is loaded into memory allocated for the font palette by step 1112 at the location specified by the old index, and a temporary mapping table (FIG. 11 B) is created to store the old index in association with the new index to provide a mapping from the old index (cell.index) to the new index (cell.newindex) to be used when loading the DCF array. The counter n into the font palette stored in the file is then incremented by item 1114 and control returns to decision 1104.

Figure 12:
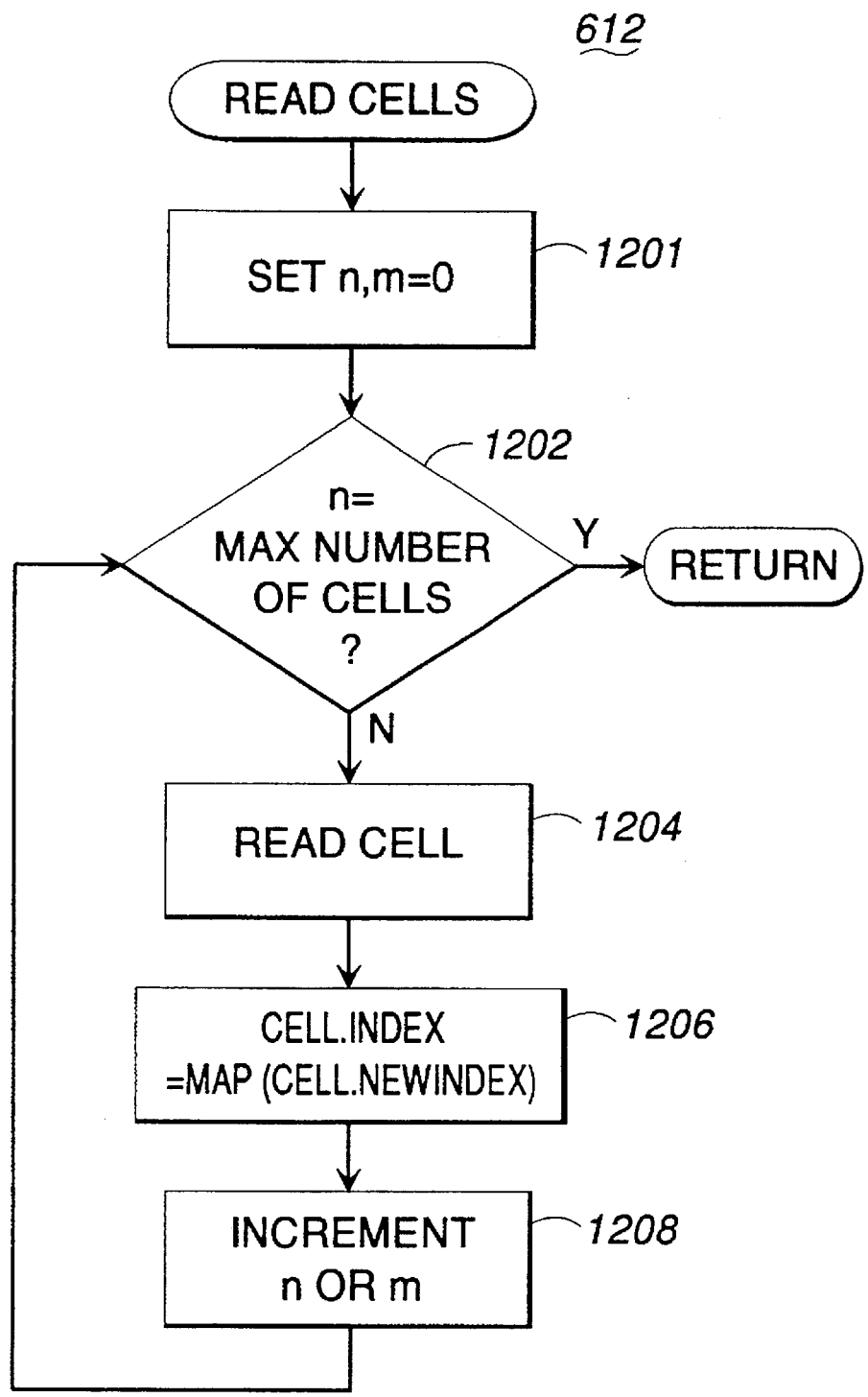
FIG. 12 is a flow diagram of the read cells routine invoked when opening a saved worksheet.

Referring now to FIG. 12, the routine 612 is invoked to read cells from a file when opening an existing worksheet. When invoked, item 1201 initializes an internal counter UID=n, FID=m to zero. Decision 1202 then determines whether an index comprising the internal counter is pointing to the last cell in the worksheet. If so, the routine returns. Otherwise, control passes to step 1204 which reads the next cell in the file and stores the cell in the appropriate worksheet location. Recall that cells are written and recalled in row major order. The reading and storing comprises reading the cell data and storing it in the appropriate memory location pointed to by UID. FID in a data array, and reading the cell formatting information and storing it in the appropriate memory location pointed to by UID, FID in the DCF array 114.

Step 1206 then resets the current cell index to a value equal to the new cell index mapped by routine 610. In other words, indices stored with cells in a file refer to old font palette locations when the file was saved. When fonts are read from a file, they may be placed in new locations by process 610. Step 1206 remaps the old index to point to the new correct location via the temporary mapping table (FIG. 11B). Step 1208 then increments the internal counter n, m to point to the next cell in the worksheet and control returns to decision 1202.

Referring now to FIG. 13, the routine 302 is invoked to allocate a new font palette when a new worksheet is created. When invoked, step 1302 allocates an array in memory which is of sufficient size to accommodate 256 font palette entries. Step 1306 sets all of the font usage counts FUC to zero to indicate none of the fonts or formats are yet in use. The routine then returns.

Referring now to FIG. 14, the routine 1500 is invoked to display the cells of a worksheet. While the routine 1500 is discussed in terms of a single cell, those skilled in the art will appreciate that the routine 1500 may be invoked repetitively to display an entire worksheet. When invoked, item 1502 selects a cell of interest by reference to the value of an index that points to a particular task (UID) and field (FID).

At decision 1503, the value of UID, FID for the cell of interest in the DCF array is tested to determine if a wild card (−1) appears at either the task or for the field. It will be recalled that a wild card appearing in any given field position for a given task indicates that the entire column (all fields in the column) receives the same format, e.g. all fields at that position for all tasks are formatted alike. Likewise, a wild card appearing in all fields of a given task (except field 1, the first field of a task) indicates that the entire row (all fields for that task) are formatted alike. If a wild card appears, at step 1505 the format for the first entry in the row (or column, as appropriate) is located by retrieving the index for the given row (or column), to determine the formatting for the selected cell having the wild card. Control then passes to step 1504.

Step 1504 then uses the index to the cell of interest to read first the data from the data array 116 and then the cell format from the DCF array 114. Step 1506 then applies the format bits to the cell by using the index associated with the cell of interest in the DCF array to retrieve the WINDOWS™ font descriptor, and by using the Style bits and Color bits for the cell of interest. The cell is displayed by step 1508, by writing the data to an appropriate location in display memory, applying the retrieved WINDOWS™ font with appropriate style and color. The present invention optimizes the speed of this process invention since display format characteristics are determined by a simple table look-up mechanism.

It will be appreciated that since the task ID for a given task remains associated with that task, the task still retains its unique task ID (UID), and the associated fields associated with that task retain their FID, even if the task or field is moved. This system of "absolute" referencing allows a task, or column of fields, to retain its formatting even if moved, which is not possible with a hashing function type formatting index system is used. Therefore, as shown in FIG. 1, if a task is moved to another location, e.g. task 4 is moved to appear after task 8, the formatting selected for application to task 4 remains associated with task 4. Advantageously, therefore, the present invention thereby provides a display formatting method and system wherein a task or column of fields may be moved while retaining its corresponding formatting information.

Accordingly, an improved method and system for applying enhanced formatting information to the data in cells of a worksheet has been described. In accordance with the principles of the present invention, a wide variety of formatting information may be associated with a worksheet cell without significantly increasing the size and memory requirements of the worksheet. The principles of the present invention are also readily applicable to virtually any type of computer application, such as word processors, data bases, etc. Accordingly, other uses and modifications of the present invention will be apparent to persons of ordinary skill without departing from the spirit and scope of the present invention, and all of such uses and modifications are intended to fall within the scope of the appended claims.

What is claimed is:

1. An improved method of formatting cells and characters in a computer spreadsheet, comprising the steps of:

allocating a worksheet data array having a plurality of cells containing data elements;

allocating a first table for storing cell format information which represents the appearance of the cells and the data elements within the cells;

allocating a second table separately from said data array for storing an index pointing to an item of cell format information stored in the first table, the second table storing the index in association with cell identifying information;

generating an index to the item of cell format information stored in the first table;

storing the cell format information in the first table according to the index;

storing the index to the cell format information in at least one location in the second table; and displaying a selected cell in accordance with the stored cell format information.

2. The method of claim 1, wherein the step of displaying a selected cell in accordance with the cell format information comprises the steps of:

in response to a command to display data elements for a selected cell, conducting a binary search in the second table to locate an entry corresponding to the selected cell;

retrieving an index from the second table pointing to an item of cell format information stored in the first table;

utilizing the retrieved index, retrieving said item of cell format information stored in the first table;

imposing the cell format information retrieved from the first table upon the data elements for the selected cell to obtain formatted data elements; and storing the formatted data elements in a display memory.

3. The method of claim 1, wherein the first table is a font palette that stores operating system font descriptor information, style information, and color information.

4. The method of claim 1, wherein the cells in the worksheet and the index in the second table are accessed with the cell identifying information.

5. The method of claim 1, further comprising the steps of:

locating an entry in the second table corresponding to the selected cell utilizing a binary search;

if the binary search indicates that a wild card character is stored in either a row identifier or a column identifier for the selected cell, retrieving the index for the initial entry of the entire row or column, respectively;

otherwise, retrieving the index associated with the row identifier and column identifier of the selected cell; and utilizing the retrieved index from the preceding two retrieving steps to retrieve cell format information from the first table.

6. The method of claim 5, further comprising the steps of:

for a new format, searching the first table to determine if the new format is already extant;

if the new format is already extant, assigning the index for the extant format to the cell identifier in the second table;

if the new format is not already extant, creating a new index to the next location in the first table and assigning the new index for the new format to the cell identifier in the second table.

7. The method of claim 6, further comprising the steps of maintaining a format usage counter indicative of the instances of usage of a predetermined format;

storing the usage counter in the first table in association with the cell format information;

incrementing the format usage counter each time a new or modified format is created that corresponds to the predetermined format.

8. The method of claim 7, further comprising the step of decrementing the format usage counter each time a format modification results in the discontinuance of usage of the predetermined format from a cell, and eliminating the format information from the first table when the format usage counter reaches zero.

9. The method of claim 7, wherein the new format includes formatting information selected from the group consisting of character font, character size, style, and color.

10. An improved method of formatting cells and characters in a spreadsheet, comprising the steps of:

allocating a worksheet data array having a plurality of cells containing data elements;

allocating a first table for storing cell format information which represents the appearance of the cells and the data elements within the cells;

allocating a second table separate from said data array for storing an index pointing to cell format information stored in the first table;

combining predetermined elements of cell format information to create a default cell format;

generating an index to the default cell format;

storing the default cell format in the first table according to the index;

storing the index to the default cell format in at least one location in the second table; and initializing each of the cells with the index to point to the default cell format.

11. The method of claim 10, wherein the first table is a font palette that stores operating system font descriptor information, style information, and color information.

12. The method of claim 10, wherein the second table is a direct cell formatting array that stores the index in combination with cell identifying information.

13. The method of claim 10, further comprising the step of changing a cell format, comprising the steps of:

recalling the index for a cell of interest;

recalling the format pointed to by the index;

modifying the cell format information in accordance with a desired format to generate modified cell format information;

determining whether the modified cell format information is already extant in the first table;

in response to determination that the modified cell format information is already extant in the first table, incrementing a format usage counter and storing the index to the extant format in the second table; and in response to determination that the modified cell format information is not already extant in the first table, storing the modified cell format information in the first table, creating a new index to the modified cell format information, and storing the new index in the second table.

14. The method of claim 13, further including the step of scanning the first table for an existing format information upon creation of a modified format and returning the index for the existing format information to the second table if a duplicate entry is found.

15. For use with a computer application program, a system for displaying character information with formatting, comprising:

a data array for storing information corresponding to a character or group of characters that are displayed according to a selected one of a plurality of display formats;

a first table for storing a plurality of display formats;

a second table for storing an index to one of said plurality of display formats in association with an identifier associated with a character or group of characters stored in said data array;

means responsive to being provided with said identifier for retrieving said index to said one of said plurality of display formats from said second table;

means responsive to said retrieved index for retrieving a selected one of said plurality of display formats from said first table; and means for imposing said selected one of said plurality of display formats upon said character or group of characters in said data array.

16. The system of claim 15, wherein said display format retrieving means comprises an eight bit indexed lookup table.

17. The system of claim 15, wherein said display format imposing means comprises a computer system display memory.

18. The system of claim 15, wherein said index retrieving means comprises a binary search engine.

19. The system of claim 18, wherein said binary search engine is operative for conducting a binary search based on a spreadsheet cell identifier comprising a row identifier and a column identifier.

20. The system of claim 19, wherein if the binary search indicates that a wild card character is stored in either the row identifier or column identifier for a selected cell, said index retrieving means is operative for retrieving the index for the initial entry of the entire column associated or row, respectively, as appropriate;

otherwise, said index retrieving means is operative for retrieving the index associated with the row identifier and column identifier of the selected cell.

21. The system of claim 15, further comprising:

means for searching said first table to determine if a particular display format is already stored therein, wherein for a new format, said searching means searches said first table to determine if said new format is already extant;

means for assigning the index for an extant format to said identifier in said second table if the new format is already extant; and means for creating a new index to another location in said first table and assigning said new index for the new format to said identifier in said second table if the new format is not already extant.

22. The system of claim 21, further comprising;

means for maintaining a format usage counter indicative of the instances of usage of a predetermined format;

means for storing said format usage counter in said first table in association with said display formats; and means for incrementing said format usage counter each time a new or modified format is created that corresponds to said predetermined format.

23. The system of claim 22, further comprising:

means for decrementing said format usage counter each time a format modification results in the discontinuance of usage of the predetermined format and eliminating said display format from said first table when said format usage counter reaches zero.

24. The system of claim 15, wherein said display format includes formatting information selected from the group consisting of character font, character size, style, and color.

25. The system of claim 15, further comprising:

means for modifying a display format associated with a character or group of characters; and means for installing said modified display format in said first table; and means for updating the index of said characters or group of characters in said second table to point to said modified display format in said first table.

26. The system of claim 15, further including means for detecting and eliminating duplicate entries in said first table.

27. A method of formatting a spreadsheet having data stored in a data array and displayed in a plurality of cells on a display, comprising the steps of:

allocating a first table that stores a plurality of display formats;

generating an index for each display format in the first table;

allocating a second table separately from the data array that stores a plurality of cell identifiers in association with indices into said first table;

storing an index to each utilized display format in said second table;

associating one of the indices with each cell in said second table; and displaying each cell in the spreadsheet according to the display format stored in the first table for the index associated with the cell.

28. The method of claim 27, further including the steps of:

in response to a user command to modify a format for a selected cell, creating a modified display format;

searching the first table to determine if the modified format is already extant;

if the modified format is already extant, incrementing a format usage counter associated with the extant display format;

assigning the index for the extant display format to the selected cell; and displaying the selected cell according to the modified format.

29. The method of claim 27, further comprising the steps of:

saving the spreadsheet including each cell together with the index associated with the cell; and saving the first table after removing currently unused display formats.

30. An improved spreadsheet structure comprising:

a plurality of data cells displayed according to one or more display formats, each data cell associated with a cell identifier;

a first table for storing the display formats;

a second table separate from said data array for storing an index to one of the display formats stored in said first table in association with a cell identifier; and means for associating one of the indices with the display identifier for each cell such that the data in each cell is displayed according to the display format associated with the index for the cell.

31. The improved spreadsheet structure of claim 30, wherein each index is located with a binary search in the second table.

32. The improved spreadsheet structure of claim 30, further including means for modifying the display format associated with the index for a cell and means for updating the index to correspond to the modified display format.

33. The improved spreadsheet structure of claim 30, further including means for maintaining a format usage counter indicative of the usages of display formats.

34. The improved spreadsheet structure of claim 33, further comprising means for incrementing the format usage counter when a cell is formatted with an already extant display format.

35. The improved spreadsheet structure of claim 34, further comprising means for decrementing the format usage counter when a display format is removed from a cell.

36. The improved spreadsheet structure of claim 30, further including:

means for modifying a display format;

means for scanning the table for an existing display format identical to the modified display format; and means for replacing a previous index for a cell with the index for the existing identical display format.

37. An improved method of formatting cells and characters in a computer spreadsheet, comprising the steps of:

allocating a worksheet having a plurality of cells containing data elements;

allocating a first table for storing cell format information which represents the appearance of the cells and the data elements within the cells;

allocating a second table for storing an index pointing to an item of cell format information stored in the first table;

generating an index to the item of cell format information stored in the first table;

storing the cell format information in the first table according to the index;

storing the index to the cell format information in at least one location in the second table;

for a new format, searching the first table to determine if the new format is already extant;

if the new format is already extant, assigning the index for the extant format to the cell identifier in the second table;

if the new format is not already extant, creating a new index to the next location in the first table and assigning the new index for the new format to the cell identifier in the second table;

maintaining a format usage counter indicative of the instances of usage of a predetermined format;

storing the usage counter in the first table in association with the format information;

incrementing the format usage counter each time a new or modified format is created that corresponds to the predetermined format;

locating an entry in the second table corresponding to a selected cell utilizing a binary search;

if the binary search indicates that a wild card character is stored in either a row identifier or a column identifier for the selected cell, retrieving the index for the initial entry of the entire row or column, respectively;

otherwise, retrieving the index associated with the row identifier and column identifier of the selected cell;

utilizing the retrieved index from the preceding two retrieving steps to retrieve cell format information from the first table;

displaying the selected cell in accordance with the stored cell format information.

38. The method of claim 37, further comprising the step of decrementing the format usage counter each time a format modification results in the discontinuance of usage of the predetermined format from a cell, and eliminating the format information from the first table when the format usage counter reaches zero.

39. The method of claim 37, wherein the new format includes formatting information selected from the group consisting of character font, character size, style, and color.

40. For use with a computer application program, a system for displaying character information with formatting, comprising:

a first table for storing a plurality of display formats;

a second table for storing an index to one of said plurality of display formats in association with an identifier associated with a character or group of characters;

a character or group of characters that are displayed according to one of said plurality of display formats;

means responsive to being provided with said identifier for retrieving said index to said one of said plurality of display formats from said second table;

means responsive to said retrieved index for retrieving a selected one of said plurality of display formats from said first table; and means for imposing said selected one of said plurality of display formats upon said character or group of characters;

means for searching said first table to determine if a particular display format is already stored therein, wherein for a new format, said searching means searches said first table to determine if said new format is already extant;

means for assigning the index for an extant format to said identifier in said second table if the new format is already extant;

means for creating a new index to another location in said first table and assigning said new index for the new format to said identifier in said second table if the new format is not already extant;

means for maintaining a format usage counter indicative of the instances of usage of a predetermined format;

means for storing said format usage counter in said first table in association with said display formats; and means for incrementing said format usage counter each time a new or modified format is created that corresponds to said predetermined format.

41. The system of claim 40, further comprising:

means for decrementing said format usage counter each time a format modification results in the discontinuance of usage of the predetermined format and eliminating said display format from said first table when said format usage counter reaches zero.

42. An improved method of formatting cells and characters in a spreadsheet, comprising the steps of:

allocating a worksheet having a plurality of cells containing data elements;

allocating a first table for storing cell format information which represents the appearance of the cells and the data elements within the cells;

allocating a second table for storing an index pointing to cell format information stored in the first table;

combining predetermined elements of cell format information to create a default cell format;

generating an index to the default cell format;

storing the default cell format in the first table according to the index;

storing the index to the default cell format in at least one location in the second table; and initializing each of the cells with the index to point to the default cell format;

recalling the index for a cell of interest;

recalling the format pointed to by the index;

modifying the cell format information in accordance with a desired format to generate modified cell format information;

determining whether the modified cell format information is already extant in the first table;

in response to determination that the modified cell format information is already extant in the first table, incrementing a format usage counter and storing the index to the extant format in the second table; and in response to determination that the modified cell format information is not already extant in the first table, storing the modified cell format information in the first table, creating a new index to the modified cell format information, and storing the new index in the second table.

43. The method of claim 42, further including the step of scanning the first table for an existing format information upon creation of a modified format and returning the index for the existing format information to the second table if a duplicate entry is found.

44. A method of formatting a spreadsheet having data displayed in a plurality of cells, comprising the steps of:

allocating a first table that stores a plurality of display formats;

generating an index for each display format in the first table;

allocating a second table that stores a plurality of cell identifiers in association with indices into said first table;

storing an index to each utilized display format in said second table;

associating one of the indices with each cell in said second table;

displaying each cell according to the display format for the index associated with the cell;

in response to a user command to modify a format for a selected cell, creating a modified display format;

searching the first table to determine if the modified format is already extant;

if the modified format is already extant, incrementing a format usage counter associated with the extant display format;

assigning the index for the extant display format to the selected cell; and displaying the selected cell according to the modified format.

45. An improved spreadsheet structure comprising:

a plurality of data cells displayed according to one or more display formats;

a first table for storing the display formats;

a second table for storing an index to one of the display formats stored in said first table in association with a cell identifier;

means for associating one of the indices with the display identifier for each cell such that each cell is displayed according to the display format associated with the index for the cell;

means for maintaining a format usage counter indicative of the usages of display formats; and means for incrementing the format usage counter when a cell is formatted with an already extant display format.

46. The improved spreadsheet structure of claim 45, further comprising means for decrementing the format usage counter when a display format is removed from a cell.

* * * * *